(12) United States Patent
Jørgensen et al.

(10) Patent No.: US 11,865,744 B2
(45) Date of Patent: Jan. 9, 2024

(54) MANUFACTURING A WIND TURBINE BLADE SHELL PART

(71) Applicant: LM Wind Power A/S, Kolding (DK)

(72) Inventors: Ya Min Jørgensen, Kolding (DK); Lars Nielsen, Kolding (DK); Klavs Jespersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 79 days.

(21) Appl. No.: 17/610,533

(22) PCT Filed: May 13, 2020

(86) PCT No.: PCT/EP2020/063308
§ 371 (c)(1),
(2) Date: Nov. 11, 2021

(87) PCT Pub. No.: WO2020/229530
PCT Pub. Date: Nov. 19, 2020

(65) Prior Publication Data
US 2022/0227076 A1 Jul. 21, 2022

(30) Foreign Application Priority Data
May 14, 2019 (EP) .................................... 19174343

(51) Int. Cl.
*B29C 70/88* (2006.01)
*B29C 70/54* (2006.01)
(Continued)

(52) U.S. Cl.
CPC .......... *B29C 70/885* (2013.01); *B29C 70/342* (2013.01); *B29C 70/54* (2013.01);
(Continued)

(58) Field of Classification Search
CPC ................................ G01B 7/10; B29C 70/885
See application file for complete search history.

(56) References Cited

U.S. PATENT DOCUMENTS

| 3,675,375 A | * | 7/1972 | Enabnit | ............... B29B 17/0206 |
| | | | | 451/28 |
| 4,763,071 A | | 8/1988 | McGee et al. | |
| (Continued) | | | | |

FOREIGN PATENT DOCUMENTS

FR 2987445 A1 * 8/2013
JP 2013-75471 A * 4/2013
(Continued)

OTHER PUBLICATIONS

Machine Translation of Japanese Patent 2013-75471, Date Unknown.*
(Continued)

*Primary Examiner* — Jeffry H Aftergut
(74) *Attorney, Agent, or Firm* — Nath, Goldberg & Meyer; Jerald L. Meyer; Tanya E. Harkins

(57) ABSTRACT

The present invention relates to a method for manufacturing a wind turbine blade part. The method comprises providing one or more wind turbine blade components including a wind turbine blade component comprising a fibre material element, an electrically conductive element, a magnetic field generator for generating an Eddy current in the electrically conductive element; arranging the electrically conductive element, the magnetic field generator, and the fibre material element such that at least a part of the fibre material element is positioned between the electrically conductive element and the magnetic field generator; generating an Eddy current in the electrically conductive element using the magnetic field generator; generating, using a magnetic sensor, a signal representing a magnetic field induced by the generated Eddy (Continued)

current, and forming the wind turbine blade part by assembling the wind turbine blade components.

16 Claims, 7 Drawing Sheets

(51) Int. Cl.
  *B29C 70/34* (2006.01)
  *G01B 7/06* (2006.01)
  *B29K 105/20* (2006.01)
  *B29K 705/02* (2006.01)
  *B29K 705/10* (2006.01)
  *B29L 31/08* (2006.01)
(52) U.S. Cl.
  CPC .......... *G01B 7/10* (2013.01); *B29K 2105/206* (2013.01); *B29K 2705/02* (2013.01); *B29K 2705/10* (2013.01); *B29K 2995/0005* (2013.01); *B29L 2031/085* (2013.01)

(56) References Cited

U.S. PATENT DOCUMENTS

| 2008/0111543 | A1 | 5/2008 | Joubert et al. |
| 2016/0023450 | A1 | 1/2016 | Schulte et al. |

FOREIGN PATENT DOCUMENTS

| JP | 2013075471 A | 4/2013 |
| JP | 2013113771 A | 6/2013 |

OTHER PUBLICATIONS

International Search Report dated Dec. 8, 2020, for application No. PCT/EP2020/063308.
Priority Search Report dated Nov. 26, 2019, for application No. EP19174343.4.

\* cited by examiner

MANUFACTURING A WIND TURBINE BLADE SHELL PART

This is a National Phase Application filed under 35 U.S.C. 371 as a national stage of PCT/EP2020/063308, filed May 13, 2020, an application claiming the benefit of European Patent Application No. 19174343.4, filed May 14, 2019, the content of each of which is hereby incorporated by reference in its entirety.

TECHNICAL FIELD

The present invention relates to a method for manufacturing a wind turbine blade shell part comprising one or more wind turbine blade components including a wind turbine blade component comprising a fibre material element.

BACKGROUND

Wind turbine blades of fibre-reinforced polymer and in particular the aerodynamic shells of wind turbine blades are usually manufactured in moulds, typically by manufacturing the pressure side and the suction side of the blade separately by arranging glass fibre mats in each of the two mould parts. Then, the two sides are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of rigid mould parts and possibly also a core material to provide parts having a sandwich structure. When the fibre mats have been stacked and overlapped so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. First, the mould cavity is evacuated via the vacuum outlets so as to form an underpressure (also known as a negative pressure), after which a supply of liquid resin is provided via the resin inlets. The resin is forced into the mould cavity at least due to the pressure differential, where it impregnates the fibre material. This process is also known as infusion. When the fibre material has been fully impregnated, the resin is cured, whereby the final composite structure results, i.e. the wind turbine blade shell part.

The manufacturing process for wind turbine blade has a degree of variation, and it is necessary to properly ascertain a number of properties of a blade after manufacturing. This includes properties such as thicknesses and/or fibre volume fractions at various points of the blade. If the thickness of a specific load-bearing part of the blade is too small, the blade will have to be discarded due to insufficient strength. If the part is too thick, the blade will be too heavy, which means that the efficiency of the wind turbine is reduced. Also, the unnecessary weight strains the hub, nacelle, and tower, increasing the risk of mechanical failure. Thus, a blade that is too heavy, must be scrapped.

A parameter such as blade thickness can be measured using destructive methods by removing a sample from the blade. However, the hole left behind, however small, weakens the composite structure and should therefore be avoided. Repairing the hole left behind by a destructive method mitigates the problem somewhat. However, the repair may not last over the lifetime of the blade, and blade inspections may need to include an evaluation of the state of such repairs.

Presently, ultrasound is used as a non-destructive testing method for measuring thicknesses of wind turbine blade shell parts. The error associated with ultrasound measurements of thicknesses of laminates for wind turbine blades with a length over 50 meters is typically around 3-5%, in well-calibrated equipment it may be down to around 2%. These ultrasound testing methods seem to be considered satisfactory within the wind turbine blade manufacturing industry.

SUMMARY OF THE INVENTION

The inventors have found that the generally accepted ultrasound testing method is not sufficiently precise when used for determining whether a blade meets the required specifications or should be scrapped. The lack of precision means that blades are scrapped even though they actually meet the specifications. An ultrasound measurement may show that a blade is too thin or too thick, which causes it to be scrapped even though it is within the acceptable limits and should not have been scrapped.

The layered structure of a fibre-reinforced wind turbine blade causes a smearing in the ultrasound signal that makes the thickness determination imprecise. Reflections from parts such as spars and shear webs also adversely affect the result. When making changes to the blade structure, such as adding additional layers for the purpose of manufacturing a blade with a thicker shell, a new calibration may be required in order to make sure the thickness measurement of the thicker blade is reliable at the new thickness. In any case, however, the before mentioned factors inherently affect the quality of ultrasound measurements adversely, leaving an error of at least 2%.

Accordingly, there is a need for an alternative method for measuring for instance the thickness of a wind turbine blade with improved precision. This will reduce the number of false negatives, i.e. reduce the number of blades that are scrapped even though they meet the specifications and thus should not have been scrapped.

A first aspect provides a method for manufacturing a wind turbine blade part. The method comprises:
  providing one or more wind turbine blade components including a wind turbine blade component comprising a fibre material element,
  providing an electrically conductive element and a magnetic field generator for generating an Eddy current in the electrically conductive element,
  arranging the electrically conductive element, the magnetic field generator, and the fibre material element such that at least a part of the fibre material element is positioned between the electrically conductive element and the magnetic field generator,
  generating an Eddy current in the electrically conductive element using the magnetic field generator,
  generating, using a magnetic sensor, a signal representing a magnetic field induced by the generated Eddy current, and
  forming the wind turbine blade part by assembling the wind turbine blade components.

This method provides a more precise thickness measure of for instance a wind turbine blade shell part is more precise than ultrasound methods. Generally, the thickness is more susceptible to variations during manufacturing in parts that are made mostly of unidirectional fibres. The method can be used for instance to measure the thickness of for instance glass fibre reinforced laminates, carbon fibre reinforced laminates, and hybrid reinforced laminates (unidirectional fibre mats mixed with carbon and glass fibres), independent of fibre axiality.

In some embodiments, the fibre material element comprises glass fibre material and/or carbon fibre material.

After performing a method in accordance with an embodiment of the present invention, the result may be a product that needs one or more further steps in order to become a wind turbine blade fully ready to be installed. For instance, the resulting wind turbine blade part may be a main laminate or part of a main laminate for a wind turbine blade, a spar cap or part of a spar cap for a wind turbine, or a shell part for a wind turbine blade shell, such as one of two shell parts to be assembled into a complete wind turbine blade shell.

Providing the fibre material element may comprise laying up fibre material on a mould surface of a mould to form a fibre material layup having a first surface facing the mould surface. In some embodiments, the electrically conductive element is embedded in the mould, and the step of generating the signal representing the induced magnetic field is performed with the magnetic sensor arranged on a second surface of the fibre material layup opposite the first surface of the fibre material layup at a time when the fibre material layup is situated on the mould surface. In other embodiments, the method comprises embedding or partly embedding the electrically conductive element in the fibre material layup proximate to a second surface of the fibre material layup opposite the first surface of the fibre material layup, and the step of generating the signal representing the induced magnetic field is performed with the magnetic sensor arranged at the first surface of the fibre material layup opposite the electrically conductive element. In yet other embodiments, the method comprises arranging a peel ply on a second surface of the fibre material layup opposite the first surface of the fibre material layup and arranging the electrically conductive element on the peel ply, and the step of generating the signal representing the induced magnetic field is performed with the magnetic sensor arranged at the first surface of the fibre material layup opposite the electrically conductive element. In yet other embodiments, the method comprises embedding the fibre material layup in a polymer to form a fibre-reinforced composite material, wherein the embedding is performed prior to the step of generating the signal representing the induced magnetic field.

The electrically conductive element may for instance comprise a conductive metal. The electrically conductive element may be a meshed structure or comprise a meshed structure. A meshed structure has a lower weight than a non-meshed structure and therefore has a lower impact on the blade, In case the conductive element is made of metal and/or if the conductive element is not removed before the blade is put into operation, this is particularly important.

In some embodiments, the conductive element is made of aluminium (Al) or copper (Cu) or magnesium (Mg) or titanium (Ti) or a combination thereof. The conductive element may be magnetisable, as long as it is conductive (as opposed to e.g. iron oxide).

The thickness of the conductive element is preferably less than 2 mm, such as less than 1 mm, such as equal to or less than 0.5 mm, such as equal to or less than 0.2 mm, such as from 0.05 mm to 0.2 mm.

A foil, especially aluminium foil, has turned out to be particularly advantageous. It is both very suitable for the measurements as such, and in addition it is cheap and readily available in thin layers, such as layers with a thickness in the range 0.1-0.2 mm.

The conductive element may have any shape, such as rectangular, square, circular, oval, triangular, or have an irregular shape. It may for instance be rectangular (such as square) with a length of one side being in the range 5-50 cm, such as 10-30 cm, such as 15-25 cm, such as 20 cm. In some embodiments, it has a circular shape with a diameter in the range 5-50 cm, such as 10-30 cm, such as 15-25 cm.

In some embodiments, the magnetic field generator is provided with a coil, and the step of generating the Eddy current comprises generating a pulsed magnetic field with the magnetic field generator.

Determining whether a thickness of the fibre material element is acceptable can be based merely on a signal directly representing the induced magnetic field. However, it may be more convenient to convert the signal representing the induced magnetic field to a thickness. Converting the signal representing the induced magnetic field to a parameter representing a thickness of the fibre material element can be based on a predetermined relationship between the signal representing the magnetic field induced by the generated Eddy current and distance between the magnetic field generator and the electrically conductive element.

Alternatively or in addition to determining a thickness of the fibre material element, the signal representing the induced magnetic field is converted to a parameter representing a fibre volume fraction or a fibre weight fraction based on a predetermined relationship between the signal representing the magnetic field induced by the generated Eddy current and the fibre volume fraction or fibre weight fraction.

The one or more wind turbine blade components may comprise an aerodynamic shell part and a root end insert to be arranged in or arranged in a root end of the aerodynamic shell part for mounting the wind turbine blade on a wind turbine hub of a wind turbine.

A second aspect provides a method for determining a parameter representing a thickness of a fibre material element. The method comprises:
 providing an electrically conductive element, a magnetic field generator for inducing an Eddy current in the electrically conductive element, and a fibre material element, wherein at least a part of the fibre material element is positioned between the electrically conductive element and the magnetic field generator,
 generating an Eddy current in the electrically conductive element using the magnetic field generator, and
 generating, using a magnetic sensor, a signal representing a magnetic field induced by the generated Eddy current.

Features provided in relation to the first aspect may also be applied to the second aspect to the extent they are compatible with the second aspect. As an example, the electrically conductive element may be made of aluminium foil having a square shape with a side length of 20 cm.

Embodiments of the method in accordance with the second aspect may be used measuring for instance at least one of:
 a thickness or a fibre volume fraction or a fibre weight fraction of a fibre material element of a wind turbine blade component, or
 a thickness or a fibre volume fraction or a fibre weight fraction of a fibre material element of an airplane component, such as a fuselage component or a wing component.

BRIEF DESCRIPTION OF THE DRAWINGS

The invention is explained in detail below by way of example with reference to the drawings.

DETAILED DESCRIPTION OF THE INVENTION

Figure 1:
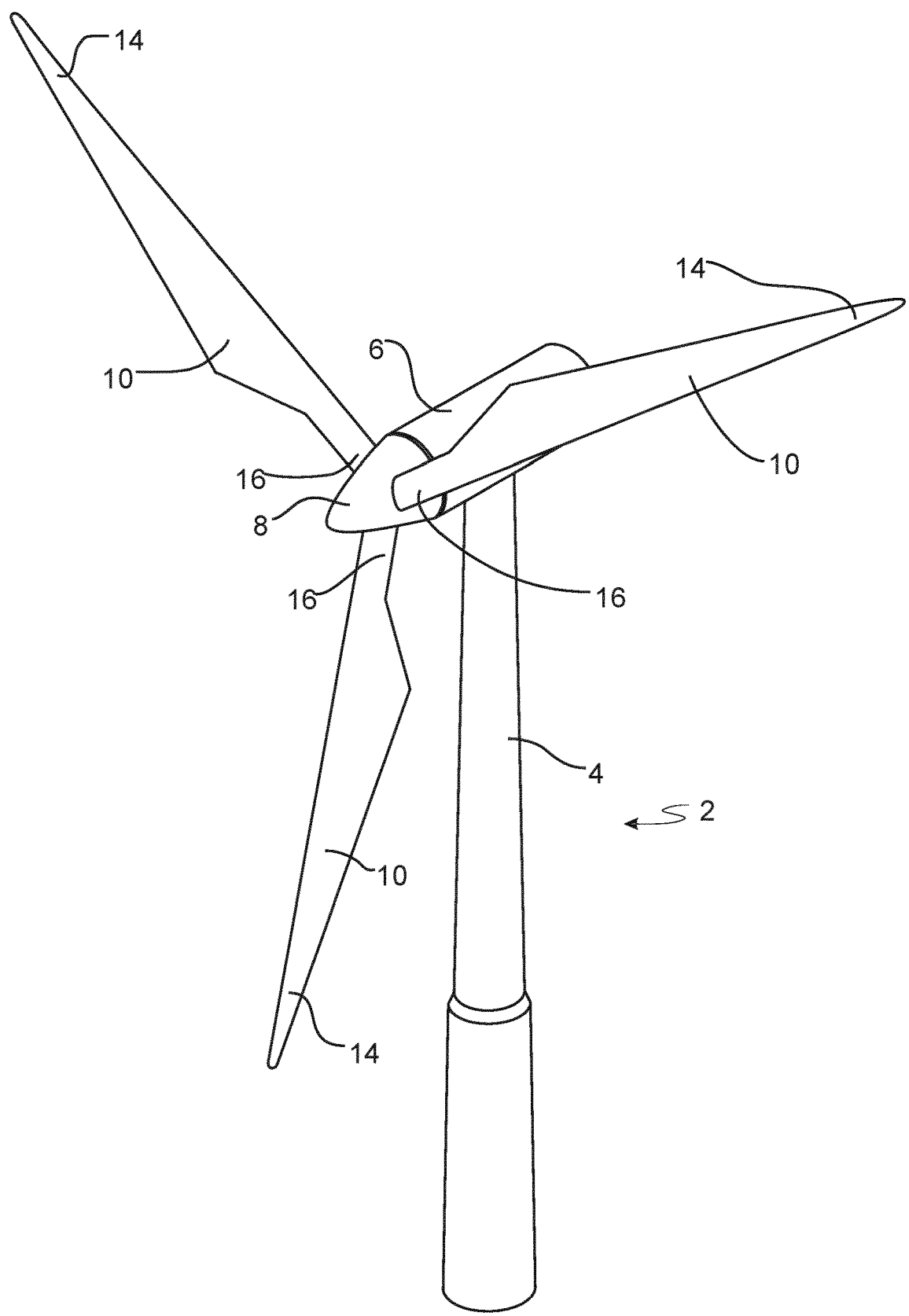
FIG. 1 shows a schematic view of a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
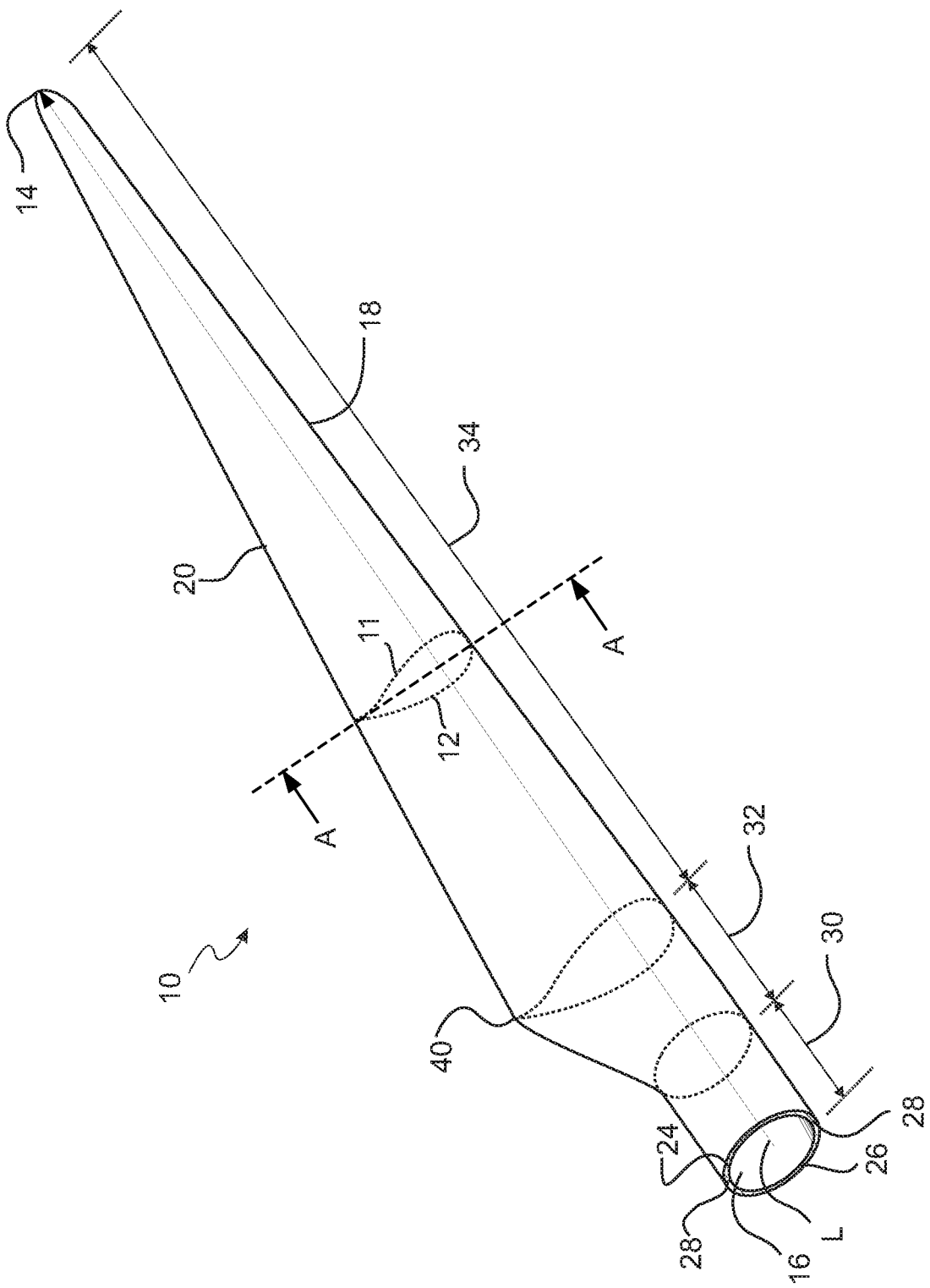
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or airfoil region 34 furthest away from the hub 8, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The airfoil region 34, also called the profiled region, has an ideal or almost ideal blade shape with respect to generating lift, whereas the root region 30 due to structural considerations has a substantially circular or elliptical cross-section, which for instance makes it easier and safer to mount the blade 10 to the hub 8. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region 34 typically decreases with increasing distance r from the hub. A shoulder 40 of the blade 10 is defined as the position, where the blade 10 has its largest chord length. The shoulder 40 is typically provided at the boundary between the transition region 32 and the airfoil region 34.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are attached to one another with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

The wind turbine blades 10 are manufactured as fibre-reinforced composite structures comprising a fibre-reinforcement material embedded in a polymer matrix. The individual blades 10 comprise an aerodynamic shell, and the pressure side shell part 24 and the suction side shell part 26 of the aerodynamic shell are often manufactured as separate parts in corresponding separate moulds, such as mould 21 illustrated in FIGS. 4-7 for manufacturing the suction side shell part 26. The blade shell parts are manufactured by arranging the fibre-reinforcement material and typically also sandwich core material, such as foamed polymer or balsa-wood, on a mould surface 22, such as the mould surface 22 of the mould 21, illustrated in FIGS. 4-7. The fibre reinforcement material may for instance be laid out as separate fibre mats that are stacked overlapping on the mould surface 22. A load-bearing structure of the blade 10 may for instance be manufactured as a spar cap, also called a main laminate, integrated in the blade shell with shear webs arranged between the spar caps of the pressure side shell part 24 and the suction side shell part 26. Alternatively, the load-bearing structure may be formed as a spar or a beam, and the aerodynamic shell is adhered to the load-bearing structure. The two blade shell parts are glued to each other, e.g. by use of internal flange parts. The fibre mats may be laid up manually on the mould surface 22 and/or by use of a fibre mat layup system, in which case the fibre mats may, at least partly, be laid up automatically or semi-automatically. When the fibre mats have been stacked and overlapped so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. The mould cavity is evacuated via the vacuum outlets so as to form a negative pressure, such as for instance 5-10% of standard pressure, 101.3 kPa, preferably lower, in the mould cavity, after which a supply of liquid resin is provided via the resin inlets. The resin is forced into the mould cavity at least due to the pressure differential, where it impregnates the fibre material. This process is also known as infusion. When the fibre material has been fully impregnated with resin, the resin is cured, whereby the wind turbine blade shell part is obtained. Embodiments of the present invention are also applicable for characterizing wind turbine blades or wind turbine blade shell parts manufactured by other methods.

Element 11 in FIG. 2 illustrates the shape of the outer surface of shell part 24 at cross-section A-A. Element 12 in FIG. 2 illustrates the shape of the outer surface of shell part 26 at cross-section A-A.

Figure 3:
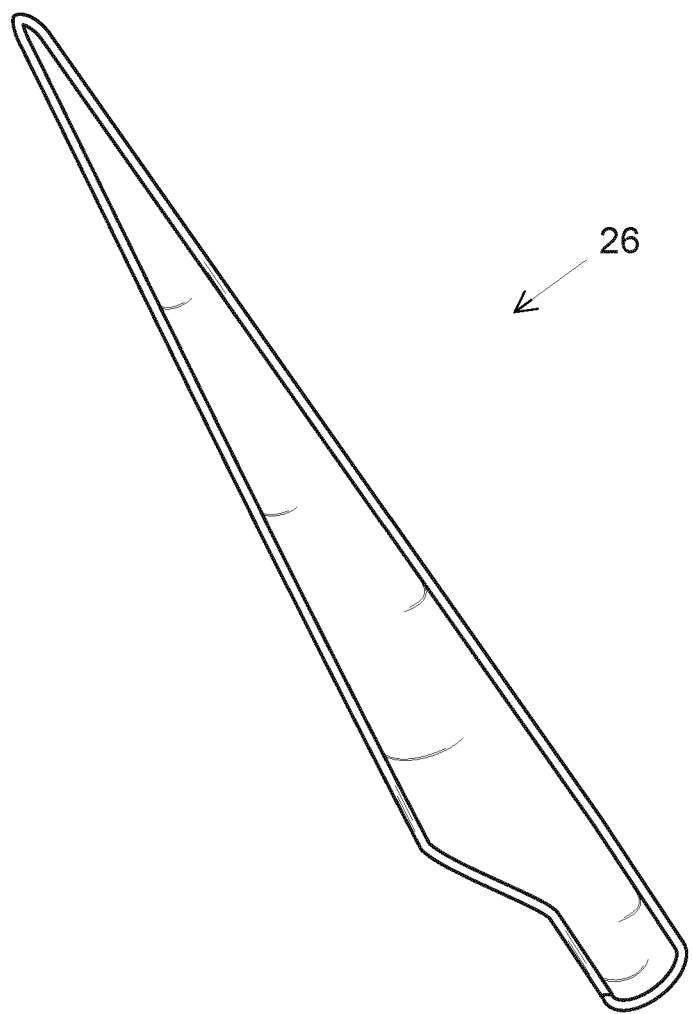
FIG. 3 shows a schematic view of a wind turbine blade shell part.

FIG. 3 illustrates schematically the wind turbine blade shell part 26 of FIG. 2 before assembling the shell parts 24 and 26 to form the closed shell of the blade 10. Some embodiments of the present method are advantageously used before shell parts such as the two shell parts 24 and 26 are assembled. Some embodiments may be used on parts and/or on a complete shell.

Figure 4:
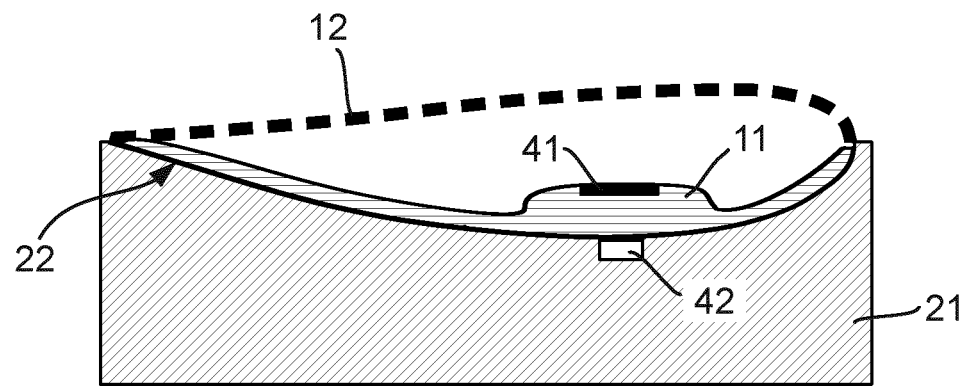
FIGS. 4-7 show a schematic view of an arrangement for measuring a thickness of a wind turbine blade shell part.

FIG. 4 illustrates a schematic view of an arrangement for measuring a thickness of a wind turbine blade shell part, such as the part 24 shown in FIG. 2. The thicker part of the blade illustrated in FIG. 4, often referred to as main laminate, is used as a spar cap to which one or more shear webs may be attached, connecting one shell part to the other shell part. This provides additional strength and prevents excessive bending of the blade when in use. Since the main laminate is a crucial part of the load-carrying capability of the blade, it is important to ensure that the thickness of the main laminate meets the requirements. If it is too thick, it might have the required strength, however at the cost of increased weight. If it is too thin, it will not meet the strength requirements and may therefore fail during use.

The dashed line 12 in FIG. 4 illustrates the outer shape of shell part 26 at the cross-section A-A shown in FIG. 2. Element 11 in FIG. 4 illustrates the A-A cross-section of the shell part 24, with the blade arranged on a mould surface 22 of a mould 21 on which the shell part 24 has been formed. A conductive element 41 is arranged near or at an inner surface of the shell part 11. The conductive element 41 can for instance be arranged between fibre mats or between fibre mats and a peel ply or between a peel ply and a vacuum bag. A magnetic field generator produces a magnetic field which in turn generates Eddy currents in the conductive element 41. A magnetic field sensor (not shown separately in the figures) is then used to measure the magnetic field induced by the Eddy currents. In FIGS. 4-10, the magnetic field generator and magnetic field sensor are integrated to form a measuring unit 42. In the embodiment shown in FIG. 4, the measuring unit 42 is embedded in the mould. After the measurement has been performed, the conductive element 41 is preferably removed. In case the conductive element 41 has been embedded in fibre mats, it can be removed for instance by grinding. The conductive element 41 typically has a thickness less than 2 mm, such as less than 1 mm, such as equal to or less than 0.5 mm, such as equal to or less than 0.2 mm, such as from 0.05 mm to 0.2 mm. Typically, a thickness of a wind turbine blade to be characterized is in the centimetre-range. Since the conductive element typically is rather thin, grinding away the conductive element has very little effect on the strength of the blade. Due to the large difference in thickness between a typical blade shell part 11 and the conductive element 41, the drawings, including the conductive elements, are not necessarily drawn to scale.

Conductive elements 41 having a thickness of 1 mm or more can also be used, but the required amount of destructive grinding increases with increasing conductive element thickness.

Figure 5:
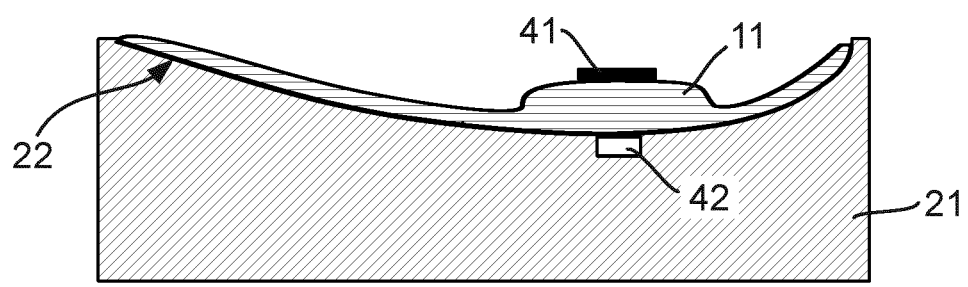

To avoid grinding (followed by repairs), the conductive element may instead be situated between a peel ply arranged on the inner surface of the shell part 11 and the vacuum bag used to seal the mould cavity during resin infusion. This is illustrated in FIG. 5. Note that the peel ply and vacuum bag are not visible in FIG. 5, but the vacuum bag covers the shell part 11, and the peel ply covers at least a part of the inner surface of the shell part 11, including at least a part of the conductive element 41. In this embodiment, the measuring unit 42 is embedded in the mould 21, similar to FIG. 4. After the measurement has been performed, the vacuum bag, peel ply, and conductive element are removed. The measurement can also be performed after removal of only the vacuum bag, as long as the conductive element 41 is situated correctly relative to the measuring unit 42 after removal of the vacuum bag.

When the conductive element 41 is arranged between the peel ply and the vacuum bag, removing the peel ply will also remove the conductive element 41.

Alternatively, the measurement can be performed by arranging the conductive element 41 on the shell part 11 after it has been formed. As in FIG. 4, the measuring unit 42 is embedded in the mould.

Figure 6:
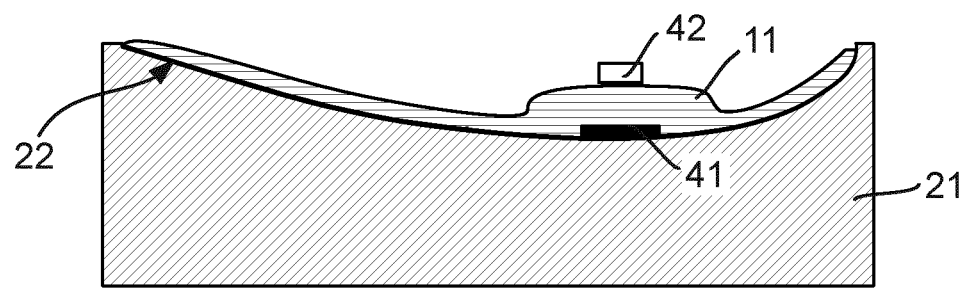

FIG. 6 is a schematic view of another arrangement for measuring a thickness of a wind turbine blade shell part. In this example, the conductive element 41 is located near or at an outer surface of the shell part 11, near or in contact with the mould surface 22 of the mould 21. The thickness is measured by arranging the measuring unit 42 on the shell part 11 at the opposite the conductive element 41, preferably after the vacuum bag has been removed, in order to make sure the thickness of the vacuum bag does not affect the measurement. This embodiment has the advantage that the measuring unit 42 can be moved around, allowing a change in the relative placement of the measuring unit 42 relative to the conductive element 41. This makes it easy to measure the thickness at points other than those at which a measuring unit 42 is embedded in the mould 21. However, generally the measurement methods can be combined, whereby certain measurements are performed while the shell part is still arranged on the mould, optionally even while the vacuum bag is still arranged on the blade, whereas other measurements are performed using embodiments in which the measuring unit 42 is freely movable as opposed to being embedded in the mould 21.

Figure 8:
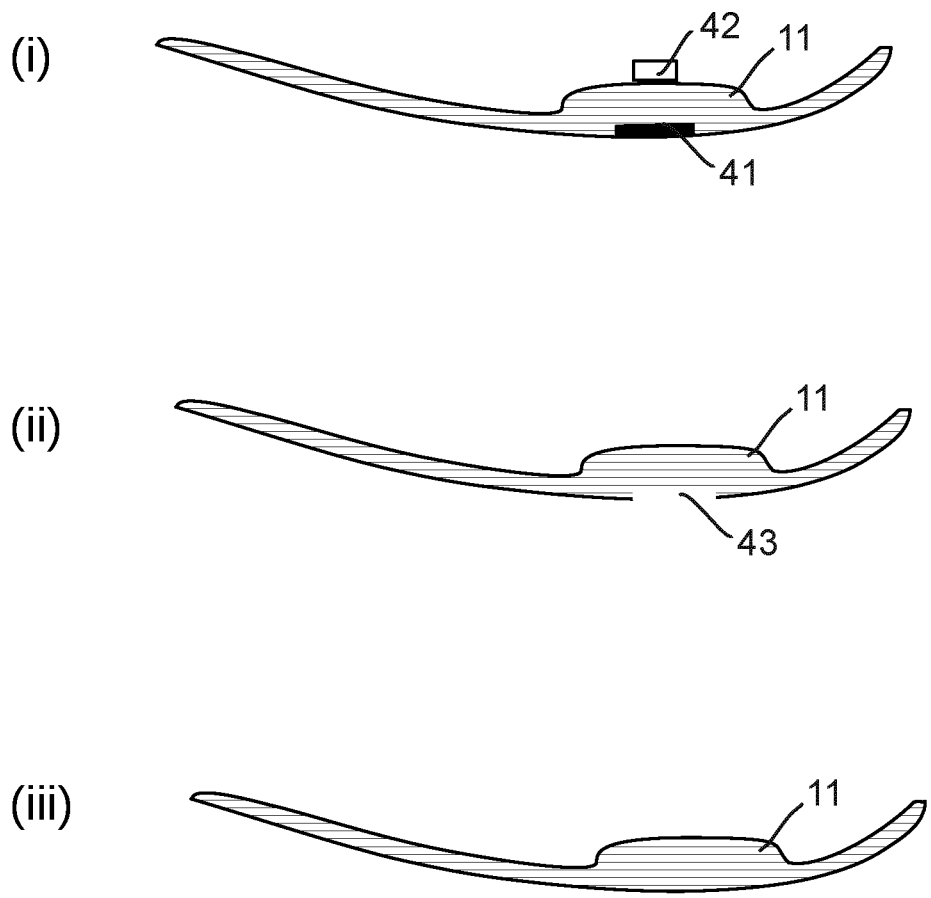
FIG. 8 shows a schematic view of a process for removing an electrically conductive element after measuring a thickness of the wind turbine blade shell part of FIG. 6.

When the conductive element 41 is arranged as part of the blade during manufacturing, as in the examples in FIGS. 4 and 6, such as in a gelcoat or between fibre layers, it should be removed, since the metal attracts lightning or at least makes the blade more susceptible to flashovers in connection with lightning strikes. FIG. 8 illustrates an example of a process for removing a conductive element arranged on or near the outer surface of a shell part 11, as in the arrangement in FIG. 6. FIG. 8($i$) illustrates the shell part 11 arranged so the outer surface, which faced the mould surface 22 during manufacturing, is accessible. The measurement may take place at this time, or it may already have been performed while the shell part 11 was still situated on the mould 21. FIG. 8($ii$) illustrates the shell part 11 after removing the conductive element 41, such as by grinding. The drawings are not to scale, and the recess 43 left behind by grinding is typically thin relative to the thickness of the blade, as described in relation to FIG. 4. For instance, a typical thickness of a main laminate is 4-7 cm, depending on the length and other features of the blade being manufactured, and as mentioned above, the conductive element can be e.g. 0.2 mm thick. Thus, only about 0.2 mm of material is removed, amounting to a relative thickness of around 0.5%.

After grinding away the conductive element 41, the surface is repaired. Because the recess is very shallow, typically less than 0.5 mm, the recess can be filled using for instance a gelcoat, resulting in the shell part shown in FIG. 8($iii$).

Figure 7:
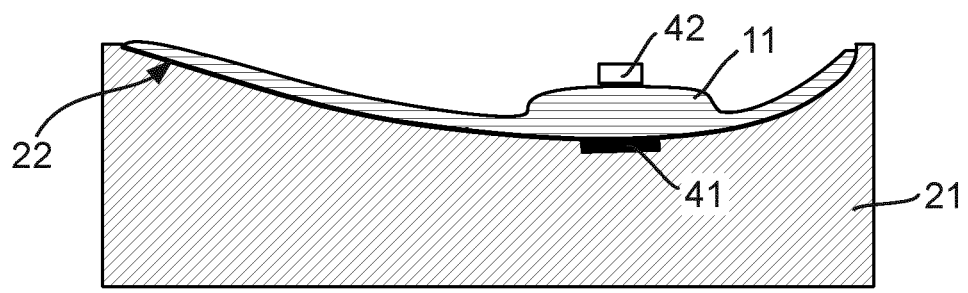

FIG. 7 is a schematic view of another arrangement for measuring a thickness of a wind turbine blade shell part. In this example, the conductive element 41 is embedded in the mould 21. The thickness of the shell part 11 is measured by arranging the measuring unit 42 on the shell part 11 opposite the conductive element 41. Similarly to the arrangement in FIG. 5, this embodiment has the advantage that the shell part 11 does not contain any metal that to be removed in a destructive manner, contrary to the method described in relation to FIG. 6 and FIG. 8. Similar to the method described in relation to FIG. 6, the measuring unit 42 is freely movable relative to the conductive element 41 situated in the mould 21. The measurement is performed while the shell part 11 is still situated on the mould 21.

Figure 9:
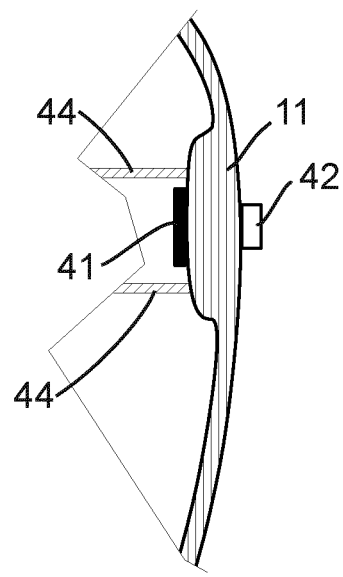
FIG. 9 shows a schematic view of an arrangement for measuring a thickness of a wind turbine blade.

FIG. 9 illustrates another arrangement for measuring a thickness of a wind turbine blade shell part. In this example, the part shown in FIG. 9 is a part of an assembled blade. In this example, the assembled blade comprises shear webs 44 arranged between the main laminate of the shell part 11 and the other shell part forming the entire shell. The conductive element 41 may for instance be aluminium tape, which is easily applied and removed. The measuring unit 42 is arranged on the opposite side, and the thickness is then measured. The tape may instead be arranged on the outer surface of the blade. However, by applying it on the inside of the blade, tape glue is not left behind on the aerodynamical surface of the blade, and the aerodynamical surface is not damaged in any way by the glue. Thus, no cleaning is required in case a small amount of glue is left behind. As a quality measure, this is preferably done in any case. The conductive element may for instance be a copper material, such as a copper mesh, for instance having a rectangular shape, such as a square shape, for instance with a side length of 20 cm.

Figure 10:
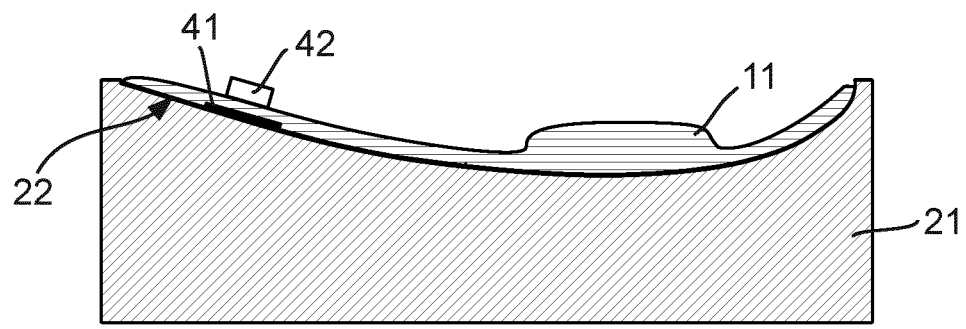
FIG. 10 shows a schematic view of an arrangement for measuring a thickness of a wind turbine blade shell part near a trailing edge of the shell part.

FIG. 10 is a schematic view of another arrangement for measuring a thickness of a wind turbine blade shell part. FIG. 10 illustrates an arrangement for measuring the thickness near the trailing edge of the shell part 11. Similar to FIG. 6, the conductive element 41 is located near or at an outer surface of the shell part 11, near or in contact with the mould surface 22. The thickness is measured by arranging the measuring unit 42 on the shell part 11 at the opposite the conductive element 41, preferably after the vacuum bag has been removed, in order to make sure the vacuum bag does not affect the measurement. Similar to the embodiment in FIG. 6, the conductive element 41 should be removed after the measurement and any defects from removal be repaired. Alternatively, the methods described in relation to the embodiments in FIGS. 4, 5, and 7 could be used. The methods described in relation to FIGS. 5 and 7 are entirely non-destructive.

In the methods described above, the conductive element 41 may be made of any metal or metal alloy. Metals or alloys comprising aluminium (Al) or copper (Cu) are advantageous. A thin aluminium foil is advantageous because it is both very suitable for the measurement as such, and in addition it is cheap and readily available in thin layers, having a thickness such as 0.1-0.2 mm. The conductive element 41 may also be a metal mesh or comprise a metal mesh. The conductive element may have any shape, such as rectangular, square, circular, oval, triangular, or have an irregular shape. For calibration purposes, a regular shape is preferred, for instance a square, with a side length of e.g. 20 cm. Preferably the conductive element has a longest dimension of at most 30 cm, such as at most 20 cm. The measuring unit 42 can be calibrated to yield the thickness directly. The calibration depends on the type of laminate, e.g. glass or carbon.

LIST OF REFERENCE NUMERALS

A-A cross-section of blade in airfoil region
L longitudinal axis of wind turbine blade
2 wind turbine
4 tower
6 nacelle
8 hub
10 wind turbine blade
11 first blade shell part (pressure side) in airfoil region
12 second blade shell part (suction side) in airfoil region
14 blade tip
16 blade root
18 leading edge
20 trailing edge
21 mould
22 mould surface
24 first blade shell part (pressure side) at root end
26 second blade shell part (suction side) at root end
28 bond lines/glue joints
30 root region
32 transition region
34 airfoil region
35 reinforced section
36 base part
40 shoulder
41 electrically conductive element
42 magnetic field generator and sensor, measuring unit
43 recess from removal of electrically conductive element
44 shear web

The invention claimed is:

1. A method for manufacturing a wind turbine blade part, the method comprising:
   laying up fibre material on a mould surface of a mould to form a fibre material layup having a first surface facing the mould surface, wherein one or more wind turbine blade components includes a wind turbine blade component comprising a fibre material element (11), wherein the fibre material element (11) comprises the fibre material layup;
   providing an electrically conductive element (41) and a magnetic field generator (42) for generating an Eddy current in the electrically conductive element;
   arranging the electrically conductive element, the magnetic field generator, and the fibre material element such that at least a part of the fibre material element is positioned between the electrically conductive element and the magnetic field generator;
   embedding or partly embedding the electrically conductive element in the fibre material layup proximate to a second surface of the fibre material layup opposite the first surface of the fibre material layup;
   generating an Eddy current in the electrically conductive element using the magnetic field generator;
   generating, using a magnetic sensor (42), a signal representing a magnetic field induced by the generated Eddy current, wherein the magnetic sensor (42) is arranged at the first surface of the fibre material layup opposite the electrically conductive element; and
   forming the wind turbine blade part by assembling the wind turbine blade components.

2. The method in accordance with claim 1, wherein the fibre material element comprises glass fibre material and/or carbon fibre material and/or a fibre-reinforced composite material.

3. The method in accordance with claim 1, further comprising embedding the fibre material layup in a polymer to form a fibre-reinforced composite material, wherein the embedding is performed prior to the step of generating the signal representing the induced magnetic field.

4. The method in accordance with claim 1, wherein the electrically conductive element comprises a conductive metal.

5. The method in accordance with claim 1, wherein the electrically conductive element is a meshed structure.

6. The method in accordance with claim 1, wherein the electrically conductive element is made of aluminium and/or copper and/or an alloy comprising aluminium and/or an alloy comprising copper.

7. The method in accordance with claim 1, wherein the electrically conductive element has a thickness which is equal to or less than 1 mm.

8. The method in accordance with claim 1, wherein the magnetic field generator comprises a coil, and the step of generating the Eddy current comprises generating a pulsed magnetic field with the magnetic field generator.

9. The method in accordance with claim 1, further comprising converting the signal representing the induced magnetic field to a parameter representing a thickness of the fibre material element based on a predetermined relationship between the signal representing the magnetic field induced by the generated Eddy current and distance between the magnetic field generator and the electrically conductive element.

10. The method in accordance with claim 1, further comprising converting the signal representing the induced magnetic field to a parameter representing a fibre volume fraction or fibre weight fraction based on a predetermined relationship between the signal representing the magnetic field induced by the generated Eddy current and the fibre volume fraction or fibre weight fraction.

11. The method in accordance with claim 1, wherein the one or more wind turbine blade components comprise an aerodynamic shell part and a root end insert to be arranged in or arranged in a root end of the aerodynamic shell part for mounting the wind turbine blade on a wind turbine hub of a wind turbine.

12. The method in accordance with claim 1, wherein the step of generating the Eddy current in the electrically conductive element using the magnetic field generator and the step of generating, using the magnetic sensor (42), the signal representing a magnetic field induced by the generated Eddy current are performed after the step of forming the wind turbine blade part.

13. The method in accordance with claim 1, wherein the conductive element comprises an aluminium foil.

14. The method in accordance with claim 13, wherein a thickness of the aluminium foil is less than 0.3 mm.

15. The method in accordance with claim 13, wherein a longest dimension of the conductive element is at most 20 cm.

16. The method in accordance with claim 13, wherein a shape of the conductive element is substantially circular or substantially square.

* * * * *